Dec. 26, 1961 J. F. BURST, JR., ET AL 3,015,027
SPECTRA RECORDING
Filed Nov. 17, 1958 3 Sheets-Sheet 1

INVENTORS:
JOHN F. BURST
JOHN M. BRAUNAGEL
BY: *James Todorovic*
THEIR ATTORNEY

Dec. 26, 1961  J. F. BURST, JR., ET AL  3,015,027
SPECTRA RECORDING
Filed Nov. 17, 1958  3 Sheets-Sheet 2

INVENTORS:
JOHN F. BURST
JOHN M. BRAUNAGEL
BY: James Todorovic
THEIR ATTORNEY

Dec. 26, 1961  J. F. BURST, JR., ET AL  3,015,027
SPECTRA RECORDING
Filed Nov. 17, 1958  3 Sheets-Sheet 3

INVENTORS:
JOHN F. BURST
JOHN M. BRAUNAGEL
BY: *James Jodorovic*
THEIR ATTORNEY

United States Patent Office 3,015,027
Patented Dec. 26, 1961

3,015,027
SPECTRA RECORDING
John F. Burst, Jr., and John M. Braunagel, Houston, Tex., assignors to Shell Oil Company, a corporation of Delaware
Filed Nov. 17, 1958, Ser. No. 774,213
4 Claims. (Cl. 250—51.5)

This invention pertains to X-ray diffraction devices and more particularly to a means and method for rapidly displaying the intensity of the radiations obtained during the X-ray diffraction of a material.

The term "X-ray diffraction" refers to the dispersing of X-rays of a single wavelength by diffracting them from planes of different spacings within a substance whose composition is to be determined by means of X-ray diffraction. In addition, this invention pertains particularly to the field of X-ray diffraction in which the diffracted X-rays are detected by means of a radiation detecting device instead of exposing photographic film to record the diffracted rays.

The using of X-ray diffraction for determining the structure of various materials is old and has been used for many years. It consists basically of exposing a sample of the material with a narrow beam of monochromatic X-rays. The sample of the material is mounted on a sample holder which is disposed at the focus point of the X-ray beam, and adapted to be rotated through a predetermined arc. The X-ray beam diffracted from the sample is passed through a receiving slot so that only those rays which are diffracted at a particular angle may pass through the slot and all others are eliminated. The magnitude of the diffracted X-ray beam passing through the slot is detected by a suitable radiation detector such as Geiger-Mueller counter. The detector produces pulses in proportion to the quanta of X-rays which impinge thereon. Suitable amplifying and recording equipment is connected to the detector so that the quanta of X-rays being diffracted at each particular angle may be recorded either by visual inspection of the recording equipment or by means of a pen-type recorder which transcribes a recording on a moving paper chart. In this type of diffraction equipment the radiation detector traverse an arc in synchronism with the sample holder which moves at one-half the speed of the detector. Thus, the diffraction pattern for the material under test is determined over a wide range of diffraction angles.

While the above-described method of X-ray diffraction is satisfactory it has one very serious disadvantage, mainly the slow speed at which the detector may be moved around the sample. This speed varies from ¼° per minute to a practicable maximum of 2° per minute. For many years it has been assumed that these relatively slow recording speeds were necessary to obtain useful patterns due to the relatively poor sensitivity of the detector used for detecting the diffracted X-rays and the relatively long time lag in processing the signal through the binary counting system. It was also assumed that the taking of measurements at a slower rate of traverse would result in better accuracy since the variations in the X-ray beam and the variation in the response of the detector would tend to average out and eliminate any irregularities.

The slow speed of progression of the detector is particularly objectionable when it is desired to conduct a thermal gradient type of X-ray diffraction analysis of a mineralogical sample. A thermal gradient type of analysis describes an X-ray diffraction analysis conducted while the sample temperature is being constantly increased. This type of analysis provides useful information regarding mineralogical samples since the relative intensities of the diffracted X-rays vary with sample temperature. Likewise the position or angle of diffraction of large diffractions or peaks may shift with sample heating. When the mineralogical samples are obtained from a petroleum drilling operation it is desirable to determine both the geological and thermal histories of the samples. This information is very important in oil well drilling since it gives an indication as to the possible presence or absence of petroleum in the formations surrounding the borehole. One set of data which aids in the reconstruction of geological and thermal histories consists of the temperatures of dehydration, inversion and recrystallization of minerals found in the geological specimen. These are monitored by X-ray diffraction equipment while the specimen is being heated.

While it is possible to conduct a thermal gradient type of X-ray diffraction analysis using prior methods it is a very slow operation and thus very costly. This results from the slow traverse of the detector which limits each analysis to the inspection of a very small angle or a single peak during any given heat treatment. Since the heating rate is sufficient to provide an increase in the sample temperature on the order of 5 to 10 degrees centigrade per minute it is impossible to vigorously monitor more than a small angle during each analysis. Thus, numerous analyses must be conducted in order to inspect the complete spectrum of the sample. The need for numerous analyses also tends to destroy usefulnes of the information obtained since one cannot be sure that all the samples used are identical in nature and mounting geometry. In most cases it is impossible to use the same sample for all analyses since most samples undergo irreversible physical changes upon heating.

This invention results from the discovery that the limiting factor in speed of recording an X-ray diffraction was not the response of the means used for detecting the diffracted X-rays but rather the means used for counting the pulses of the detector and recording them. This is particularly true where a pen-type recording mechanism is used since the recovery of the average pen recorder is on the order of one to two seconds, thus necessitating a relatively slow recording rate if satisfactory results are to be obtained. This invention substitutes a rate meter for the usual binary counter to increase the speed at which the impulses from the detector may be counted and a fast reacting method for recording the magnitude of the diffracted X-rays. Several instruments are avai'able for fast accurate recording of the fluctuating electrical current supplied by a rate meter. For example, oscilloscopes, seismic recorders or other types of moving beam recorders may be used.

The use of an oscilloscope provides an almost instantaneous means for recording the variation of the magnitude and displacement of the diffracted X-rays. The use of a rate meter and the elimination of the usual binary counter provides a fast means for converting the impulses of the detector to an electric current whose magnitude varies in proportion to the impulses of the detector.

The term moving beam used above means any beam which produces a spot of light capable of producing a visible trace when it strikes a suitable material. In addition, the beam should be controllable so that a trace may be formed which is an indication of the magnitude and angular position of the diffracted X-rays. In an oscilloscopic device this beam is the electron beam which is swept across the face of the scope, while in a photoelectric galvanometer the beam is the light from the galvanometer mirror which is used to generate a trace on photographic film. The use of a photoelectric ga'vanometer for recording information is well known in the geological field where it is used to record seismograms.

Accordingly, it is the principal object of this invention to provide a rapid and simple means for displaying the diffraction pattern of a material in an X-ray diffraction process.

It is a still further object of this invention to provide a rapid means for displaying an X-ray diffraction pattern utilizing a beam of light capable of producing a trace when it strikes a luminescent material.

It is also an object of this invention to provide a novel method by which a thermal gradient type of X-ray diffraction analysis covering the complete spectrum of a sample may be performed in a single analysis of the sample.

It is a still further object of this invention to provide a rapid means for displaying an X-ray diffraction pattern utilizing a moving beam and a material which produces a visible trace when the beam impinges thereon. The horizontal position of the beam is controlled so that it is proportional to the angle of the diffracted X-rays while its vertical position is controlled to indicate the magnitude of the diffracted X-ray.

It is a still further object of the invention to provide a rapid recording means for an X-ray diffraction pattern which utilizes an oscilloscope in which the horizontal position of the electron beam is controlled so that it is proportional to the angle of the diffracted X-ray and the vertical position is controlled so that it represents the magnitude of diffracted X-ray.

The above objects and other advantages of this invention are obtained by modifying the previously used X-ray diffraction systems. Instead of utilizing the normal binary counter and pen recording equipment supplied with the commercial equipment, this invention utilizes a rate meter which converts the impulses of the radiation detection device to an electric current whose magnitude varies in direct proportion to the magnitude of the diffracted X-rays. The electric current is used to control the vertical sweep of the oscilloscope while the horizontal sweep is controlled by the same means which is used to rotate the detection means and the sample holder. This results in a trace on the screen of the oscilloscope whose horizontal dimension indicates the angular position of the diffracted X-ray and whose vertical position indicates the magnitude of the diffracted X-rays.

The above objects and advantages of this invention will be more easily understood from the following detailed description of a preferred embodiment when taken in conjunction with the attached drawings in which.

Figure 1:
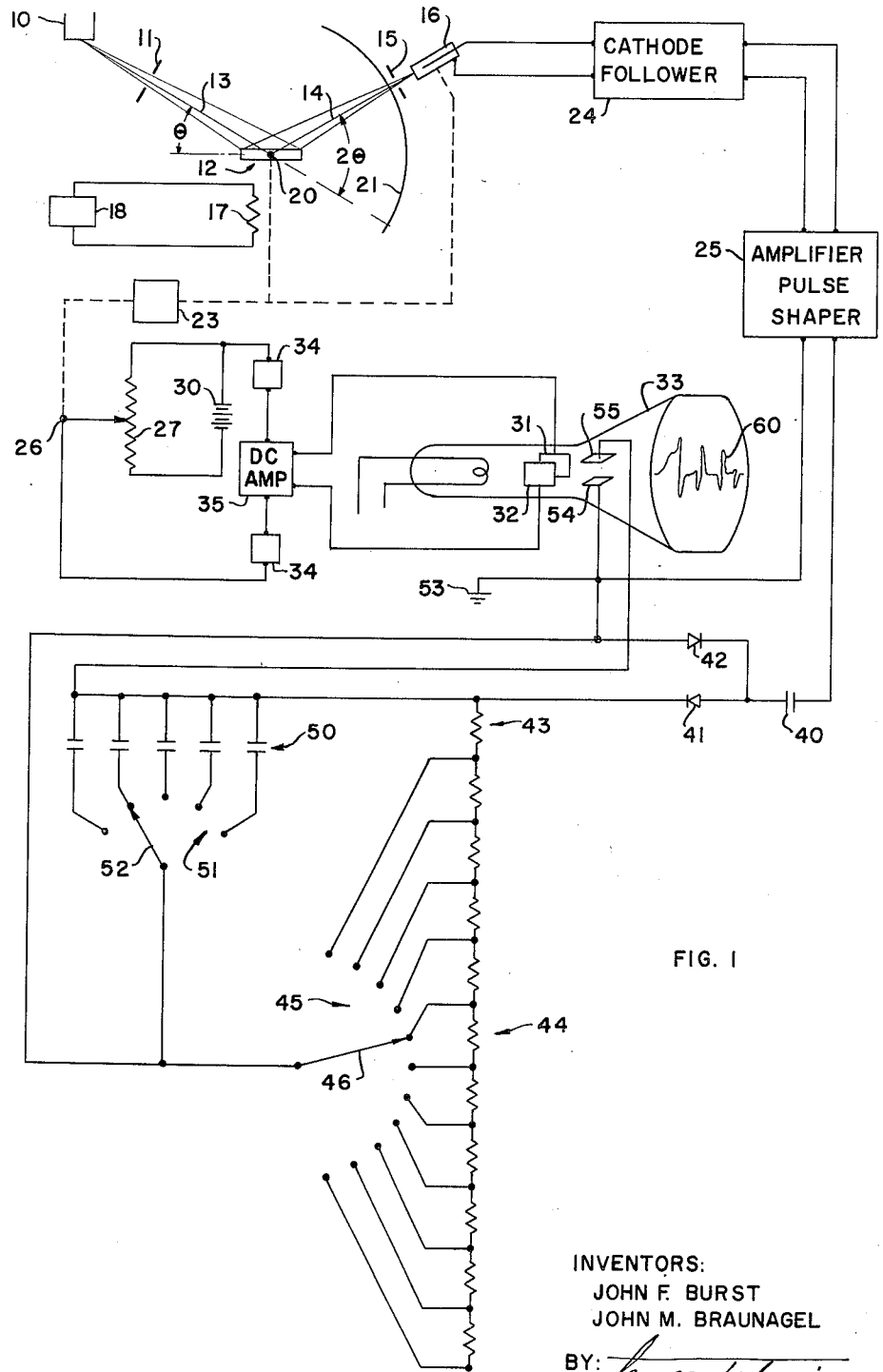
FIGURE 1 is a schematic drawing of the complete system.

Referring now to the drawing there is shown a source of X-rays 10 whose beam 13 is focused by means of a collimating assembly 11. The X-ray beam 13 strikes the sample which is supported by a sample holder 12 and is diffracted by the planes in the crystals of the sample into a diffracted beam of X-rays 14. The diffracted beam of X-rays 14 passes through a narrow receiving slot which eliminates or blocks all X-rays except those which occur at a very narrow angle. After the beam passes through the receiving slot 15, the X-rays strike the detector 16 and generate impulses in proportion to the quanta of X-rays which pass through the receiving slot 15. The detector 16 may be any well known type of detector, such as a Geiger-Mueller tube or a scintillation counter. The sample holder 12 is provided with a heating means so that the temperature of the sample may be increased at any desired rate. A suitable heating means would be an electrical resistance heating element 17 which is controlled by a controller 18 so that rate of heating may be accurately controlled. The sample holder 12 is disposed so that it may be rotated about an axis 20 while the radiation detector is supported so that it traverses an arc 21. The radiation detector and sample holder are both driven by a motor 23 with the sample holder rotating at one-half the angular speed of the detector 16. The sample holder is mounted so that the X-ray beam that passes through the collimating assembly 11 strikes the center of the holder while the detector 16 is mounted to receive the diffracted X-rays passed by the receiving slot 15. The receiving slot 15 is positioned to pass only X-rays which are diffracted from the sample at an angle of twice the angle of the X-rays from the source 10.

The impulses of the radiation detector 16 are connected to a cathode follower 24 whose output is connected to an amplifier and pulse shaper 25. The amplifier and pulse shaper should be designed so as to supply a uniform pulse preferably having a narrow, differentiated, square wave form for each impulse or discharge of the detector 16. The motor 23 in addition to driving the sample holder and detector should also drive the movable arm 26 to a rheostat 27 to insure that the voltage signal of the rheostat is proportional to the position of the sample holder. One end of the rheostat is connected directly to a battery 30 with the other terminal of the rheostat being connected through a synchronizing circuit 34 to a direct current amplifier 35. The movable arm 26 is connected to a second synchronizing circuit 34 whose output is also connected to the direct current amplifier 35. The output of the amplifier 35 is connected to the plates 31 and 32 which control the horizontal sweep of the cathode ray tube 33.

From the above description it may be seen that the sample supported by the sample holder 12 will be exposed to a narrow beam of X-rays from the source 10 and diffract the beam into a beam 14. The receiving slit 15 will discriminate against all diffracted rays except those which occur over a very narrow diffraction angle. The motor which is used to drive the detector around the arc 21 and the sample holder 12 about its axis is also used to control the rheostat 27 thus providing a means of controlling the horizontal sweep of the cathode ray tube 33 so that it is directly proportional to the position of the detector 16. The angle between the beam 13 and the beam 14 which is represented by the position of the detector 16 is equal to twice the diffraction angle of the material. Of course, in actual practice the sample holder 12, detector 16 and drive motor 23 are all mounted on a single frame or housing with the complete instrument being known as a goniometer.

One lead of the amplifier and pulse shaper 25 is connected directly to ground 53 and the other lead to a capacitor 40. The other side of the capacitor 40 is connected to rectifying elements 41 and 42 which are disposed in opposition to each other. The rectifying elements 41 and 42 are preferably germanium or silicon point-contact diodes but may be any well known diodes which have fast recovery times on the order of $10^{-7}$ seconds.

The input side of the diode 42 is connected directly to ground while the output side of the diode 41 is connected to a parallel resistance bank 44 and capacitor bank 50. Disposed between the output side of the diode 41 and the resistance bank 44 there is an additional resistance 43. The resistor bank 44 consists of ten resistors of substantially the same size and is provided with ten terminals 45. A switch arm 46 is disposed so that it may contact each of the individual terminals 45 as the arm 46 is rotated. The capacitor bank 50 consists of five capacitors whose value vary by multiples of two. The capacitor bank 50 is provided with terminals 51 and a contact arm 52 which may be positioned to contact any of the terminals 51. Suitable values for the resistance of the resistor bank 44, are 10,000 ohms while the capacitors of the capacitor bank 50 should vary from a low value of .5 microfarad to a value of 8 microfarads.

The resistor bank 44 and capacitor bank 50 are connected to one plate 55 of the cathode ray tube 33 while the other plate 54 is connected directly to ground. The switch arms 46 and 52 are both grounded, thus the plates 54 and 55 which control the vertical sweep of the cathode ray tube 35 will respond to the output of the detector 16.

From the above description it will be appreciated that a simple rate meter has been provided which will convert the impulses of the detector 16 to an electric current whose magnitude varies in proportion to the number of impulses of the detector 16. This electric current can be impressed upon the plates 54 and 55 to control the vertical sweep of the electron beam of the tube 33 while the horizontal sweep is controlled by the means used for rotating the sample holder 12 and detector 16. By providing a capacitor bank 50 and resistor bank 44 and connecting them in parallel, a simple means is provided by which the time constant of the rate meter may be varied. This variation of the rate meter time constant may be utilized to alter the probable error of the instrument. Due to the fast recovery of the rate meter it is possible to move the detector 16 at a relatively rapid rate, on the order of one degree per second, and still obtain excellent results on major diffraction peaks. This, of course, decreases the time required for conducting an X-ray diffraction analysis of a material by a factor of 60 over previously-used methods.

Figure 2:
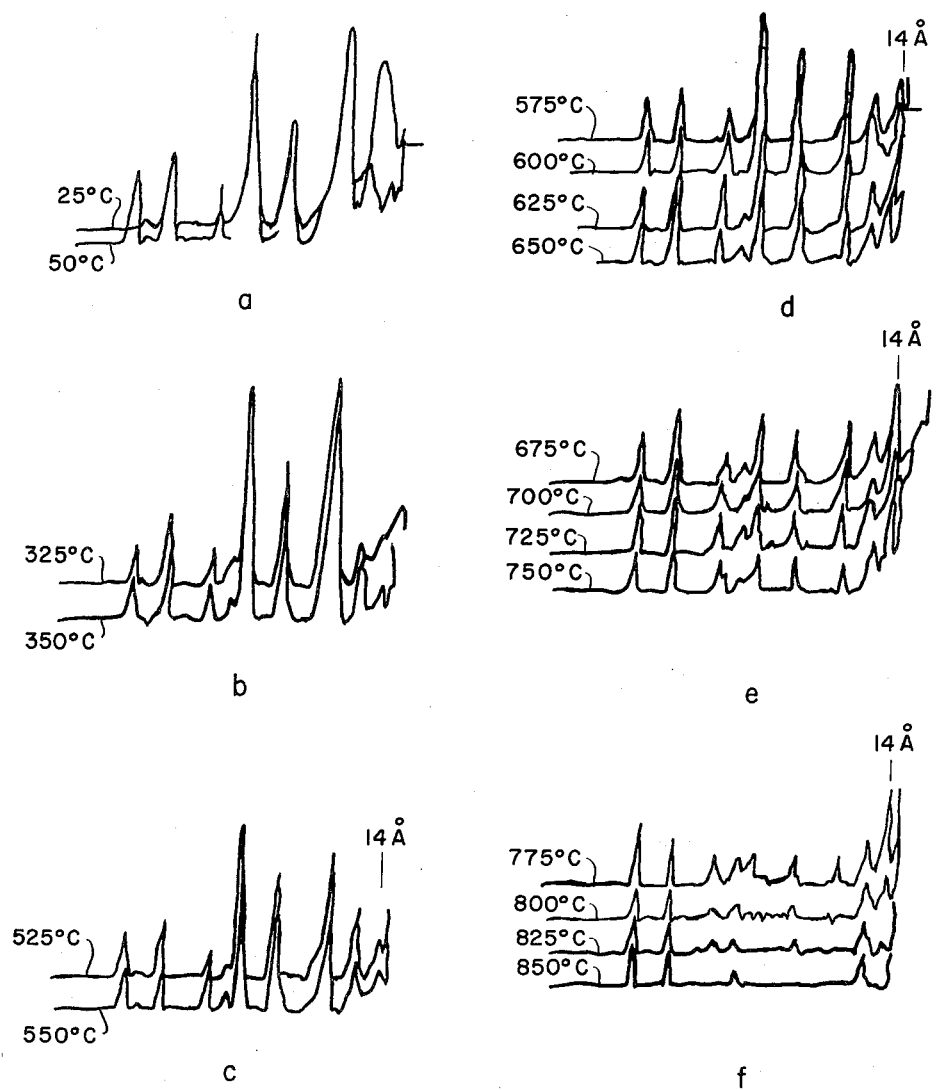
FIGURE 2 is a series of tracings from an oscilloscope showing the thermal gradient X-ray diffraction pattern of a geological sample.

Referring now to FIGURE 2, there is shown a series of photographs of the tracings appearing on the oscilloscope 33 of FIGURE 1 while conducting a thermal gradient X-ray diffraction analysis on a mixture of kaolinite, montmorillonite and chlorite. One or more of these minerals are present in most oil well geologic recovery samples. The sample was mounted on the sample holder 12 and the analysis conducted while heating the sample at a constant rate. The temperature of the sample for each tracing is noted directly on the individual tracings. By examining this series of tracings it can be seen that the fourteen angstrom diffraction line increases in intensity and reaches a maximum at about 850 to 875 degrees centigrade. This increase in intensity discloses a rearrangement of the higher chlorite basal orders.

An excellent example of the monitoring ability of the system of this invention can be gained from a study of photographs 2e and 2f which show the complete breakdown of the sample. The single peak remaining on the right side of the lowest trace in FIGURE 2f is a 10 angstrom mica line. This is the primary basal spacing in mica-type minerals. The two peaks on the left represent diffractions from the platinum sample holder 12 and are not part of the mineral sample.

Figure 3:
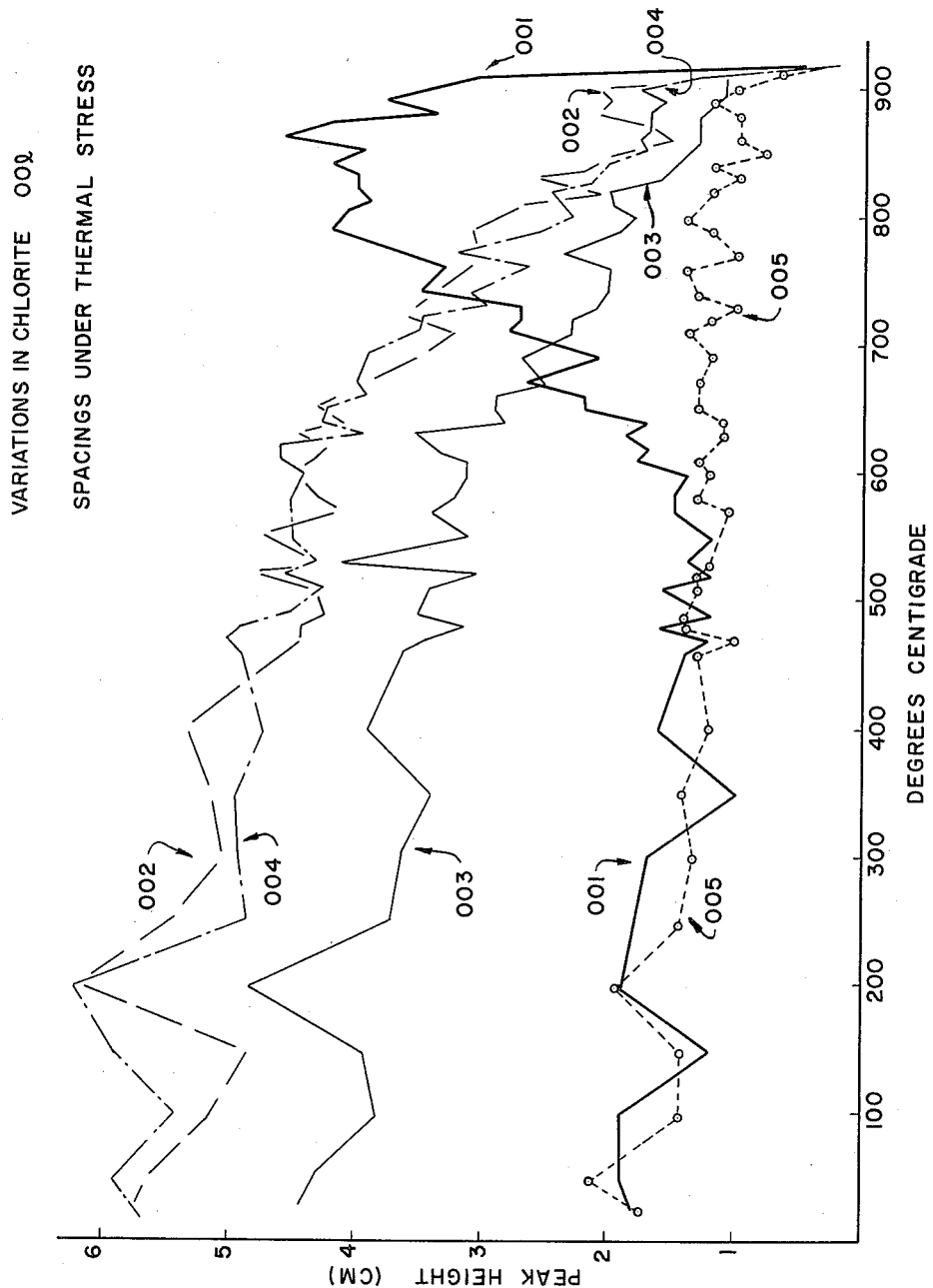
FIGURE 3 is a curve showing the variations in the intensities of several peaks shown in FIGURE 2 as the sample is heated.

The heights of several of the individual peaks shown in the tracings of FIGURE 2 are plotted in FIGURE 3 against temperature. This plot illustrates the relatively stable character of the mineral chlorite in the sample in the temperature range of 50 to 550 degrees centigrade. After 550 degrees the 002, 003 and 004 basal lines of this chlorite decline in intensity while the 001 basal or 14 angstrom line increases reaching a maximum at about 800 to 850 degrees. The 005 basal line remains substantially constant for the full temperature range with all of the lines decreasing rapidly at about 900 degrees. As pointed out above, the mineral sample is completely broken down at about 875 to 925 degrees. Thus one can easily determine the thermal energy required to alter the structures as illustrated by the growth of the chlorite basal spacing (001).

All of the information shown in FIGURES 2 and 3 was obtained in a single analysis lasting approximately 180 minutes. In order to obtain this same information using prior methods it would have been necessary to conduct five separate analysis of five separate samples or, a single analysis for each basal line or peak plotted in FIGURE 3. Each of these individual analysis would require about 180 minutes or a total of 15 hours to obtain a complete analysis of a single sample. The slowness of prior systems resulted from their slow recording speeds which required one to oscillate the detector about a single peak or basal line as the sample was heated in order not to miss sudden changes in the intensity of the peak which occur at certain temperatures. The use of the system and method of this invention permits one to traverse the complete arc of travel of the detector 16 in 60 seconds. Thus, no important changes in the intensity of the various peaks will be missed and a complete analysis may be obtained from a single sample during a single run.

While but one preferred embodiment of this invention has been described in detail any modifications and changes may be made without departing from the broad spirit and scope, for example, as explained above in place of a cathode ray tube one may substitute a photoelectric galvanometer such as those used for recording seismograms. However, if a photoelectric galvanometer is used the displacement of the light beam of the galvanometer should be controlled by the output of the rate meter circuit while the movement of the photographic film should be controlled by the motor 23 which drives the sample holder and detector. Thus, the magnitude of trace on the film will indicate the intensity of the diffraction X-ray while the position around the horizontal axis will indicate the diffraction angle.

We claim as our invention:

1. An apparatus for forming a rapid graphic display of the X-ray diffraction pattern of a material comprising: means for directing a beam of substantially monochromatic X-rays onto the material; a detecting means disposed to produce electrical pulses proportional to the intensity of the radiation diffracted from the material; drive means for moving said detecting means along an arc having an axis passing through the material while rotating the material about the same axis, said arc being of sufficient length to provide a complete diffraction pattern of the material; circuit means for producing a first electrical current which varies substantially instantaneously with the variations in the pulse rate; said drive means being coupled to an additional circuit means for producing a second electrical current which varies with the position of said detecting means and a cathode ray tube having its vertical deflection controlled by said first electrical current and its horizontal deflection controlled by said second electrical current.

2. An apparatus for forming a rapid graphic display of the X-ray diffraction pattern of a material comprising: means for directing a beam of substantially monochromatic X-rays onto the material; a detecting means disposed to produce electrical pulses proportional to the intensity of the radiation diffracted from the materials; drive means for moving said detecting means along an arc having an axis passing through the material while rotating the material about the same axis, said arc being of sufficient length to provide a complete diffraction pattern of the material; circuit means including parallel resistance and capacitance branches for converting said electrical pulses into a first electrical current which varies substantially instantaneously with said electrical pulses; additional circuit means driven by said drive means for producing a second electrical current which varies with the position of said detecting means, and a cathode ray tube having its vertical deflection controlled by said first electrical signal and its horizontal deflection controlled by said second electrical current.

3. An apparatus for forming a rapid graphic display of the complete X-ray diffraction pattern of a material comprising: means for directing a beam of substantially monochromatic X-rays onto the material; heating means including a control for heating the material at a predetermined rate; a detecting means disposed to produce electrical pulses proportional to the intensity of the radiation diffracted from the materials; means for moving said detecting means along an arc having an axis passing through the material while rotating the material about the same axis, said arc being of sufficient length to provide a complete diffraction pattern of the material; circuit means including parallel resistance and capacitance branches for converting said electrical pulses into a first electrical current which varies substantially instantaneously with said electrical pulses; additional circuit means for producing a second electrical current which varies with the position of said detecting means, and a cathode ray tube having its vertical deflection controlled by said first electrical signal and its horizontal deflection controlled by said second electrical current.

4. An apparatus for determining the thermal gradient X-ray diffraction analysis of a sample comprising: a sample support means; a heating means disposed to heat said sample support means at a predetermined rate; a source of monochromatic X-rays including means for directing said X-rays onto said sample support means; detecting means disposed to produce electrical pulses proportional to the intensity of the radiation diffracted from a sample mounted on said sample support means; means for rotating said sample support about an axis while said detecting means traverses an arc in synchronism with said sample support means, said arc having a center coinciding with the axis of said sample support means and a length sufficient to provide a complete diffraction pattern of the material; a first circuit means coupled to said rotating means for producing a first electrical current proportional to the angular position of said sample support means; a second circuit means including parallel resistance and capacitance branches for converting said electrical pulses into a second electrical current proportional to the electrical pulses produced by said detecting means; and a recording means responsive to said first and second electrical signals for producing a visible trace one dimension of which corresponds to the angular position of said sample support and the other dimension of which corresponds to the number of pulses produced by said detecting means.

References Cited in the file of this patent
UNITED STATES PATENTS 2,805,340     Lewis _____ Sept. 3, 1957

OTHER REFERENCES

Bertin: "Visual Presentation of X-ray Diffraction Patterns by Electronic Means," article in Analytical Chemistry, vol. 25, No. 5, pages 708 to 711; May 21, 1953.